United States Patent [19]

Winnicki

[11] Patent Number: 4,733,495
[45] Date of Patent: Mar. 29, 1988

[54] FLYING INSECT EXTERMINATOR

[76] Inventor: James Winnicki, 7500 Whirlaway St., Bakersfield, Calif. 93307

[21] Appl. No.: 52,716

[22] Filed: May 21, 1987

[51] Int. Cl.$^4$ .............................................. A01M 5/02
[52] U.S. Cl. ....................................... 43/139; 43/134
[58] Field of Search ................. 43/110, 139, 134, 135; 15/344, 341

[56] References Cited

U.S. PATENT DOCUMENTS

| | | | |
|---|---|---|---|
| 454,720 | 6/1891 | Dexter | 43/139 |
| 1,141,039 | 5/1915 | Cox | 43/139 |
| 3,711,987 | 1/1973 | Fisk | 43/134 |
| 3,965,608 | 6/1976 | Schuman | 43/139 |
| 4,584,733 | 4/1986 | Tietge | 15/341 |
| 4,631,858 | 12/1986 | Kahle | 43/134 |

FOREIGN PATENT DOCUMENTS 8400280 2/1984 European Pat. Off. ............. 43/139

Primary Examiner—Kurt Rowan
Attorney, Agent, or Firm—Jack C. Munro

[57] ABSTRACT

A flying insect exterminator wherein a tube is moved by actuation of a trigger from a retracted position to an extended position. The forward end of the tube is to surround the insect and a vacuum is to be drawn into the tube which will cause the insect to be sucked into an insect collecting screen mounted within the tube.

8 Claims, 6 Drawing Figures

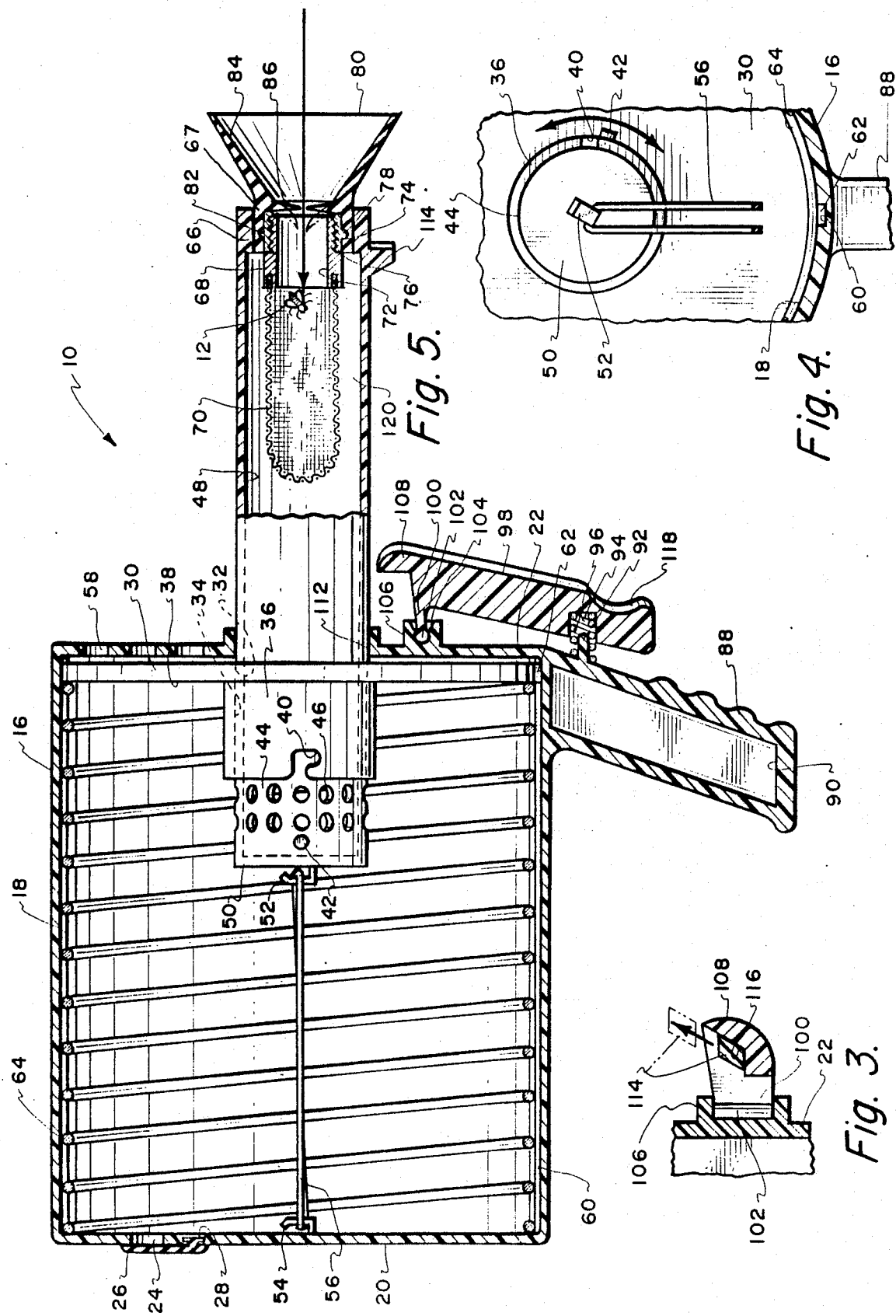

FLYING INSECT EXTERMINATOR

BACKGROUND OF THE INVENTION

The field of this invention is related to a flying insect exterminating apparatus which utilizes a vacuum which creates an airstream that will draw the insect into an insect collecting stream which is sufficient to cause killing of the insect.

Flying insects such as flies, mosquitos and the like are a definite undesirable annoyance within homes, offices, restaurants and other such establishments. To rid one of such flying insects, it is common to utilize a fly swatter. A fly swatter, when swung by a human being at the insect, literally smashes the insect most commonly causing a smudge on the wall, window or whatever surface the insect was located. Therefore, the user may be in a quandary as to whether to swat the fly, causing the smudge, or just to leave the fly alone.

As an alternative of swatting of flies, there has been commonly used fly paper. Fly-paper is a strip of paper upon which is been applied a sticky substance and also an attractant. If the fly lands on the fly paper, the fly is not able to get free and eventually dies. The use of fly paper is generally considered to be unsightly as well as unsanitary.

Another way in which insects are commonly exterminated is through the use of an insecticide. However, each insecticide permeates the air with an undesirable odor. Therefore, the use of such an odor in certain environments such as homes, office and restaurants is not desirable.

Some flying insects such as the common household fly are quite elusive. However, it has been found that if one takes an intake nozzle of a fly exterminator and points it directly at, and in close proximity to, a fly which has lighted on an object, and that intake nozzle be thrusted forward rapidly, that the fly will be captured within that nozzle. It has been known in the past to utilize such a thrusting flying insect exterminating device and reference is to be had to U.S. Pat. Nos. 1,308,497 issued to B. R. Jolly and 454,720 issued to H. C. Dexter. Also, the following Patent references may be found to be of interest: U.S. Pat. Nos. 4,449,319 issued to Gerry R. Garcia; 3,231,997 issued to Earl M. Shugarman; 1,797,557 issued to E. R. Stine, et al.; 1,377,201 issued to B. R. Jolly; 995,911 issued to R. J. Russel; 1,141,039 issued to R. H. Cox; and 3,330,063 issued to C. J. Lockwood.

SUMMARY OF THE INVENTION

The structure of the present invention is directed to a trigger actuated thrusting device which is to capture a flying insect, when at rest, and cause this insect to be moved to within the device and killed. The primary objective of the present invention is to construct an improved version of such a thrusting device which insures the extermination of the insect.

Another primary objective of the present invention is to construct a flying insect exterminating device which exterminates the insect without causing any smudge on any surface during the extermination process.

Another objective of the present invention is to utilize a flying insect exterminator which does not require the use of any unsightly or unsanitary devices.

Another objective of the present invention is to construct a flying insect exterminator which does not require the use of any toxic substance.

The structure of the present invention utilizes an enclosed housing which includes an interior chamber. Within this interior chamber is to be drawn a vacuum. This housing is connected to a tube. This tube is to be movable from a retracted position (confined primarily within the housing) to an extended position (the main portion of the tube protruding some distance from the housing). When the tube is moved from the extended position to the retracted position, a coil spring is compressed. When the tube is released by a trigger mechanism to permit movement from the retracted position to the extended position, the tube will move rapidly to the extended position. Only upon the tube reaching the extended position will the vacuum within the housing be permitted to be drawn into the tube and hence to the outer free end of the tube. At the outer free end of the tube is located an insect receiving chamber. There is also located within the tube an insect collecting screen. The vacuum will cause the insect within the insect receiving chamber to be drawn into the insect collecting screen. The insect will either be killed by the force of the movement against the screen or will expire by being confined in this area of the screen.

BRIEF DESRIPTION OF THE DRAWINGS

FIG. 3 is a cross-sectional view through a portion of the trigger mechanism of the apparatus of FIG. 2 taken along line 3—3 of FIG. 2;

FIG. 4 is a rear view of the tube section of the flying insect exterminating device of this invention taken along line 4—4 of FIG. 2;

FIG. 5 is a view similar to FIG. 2 but showing the tube in the extended position and the insect captured and located within the insect collecting screen.

DETAILED DESCRIPTION OF THE SHOWN EMBODIMENT

Figure 1:
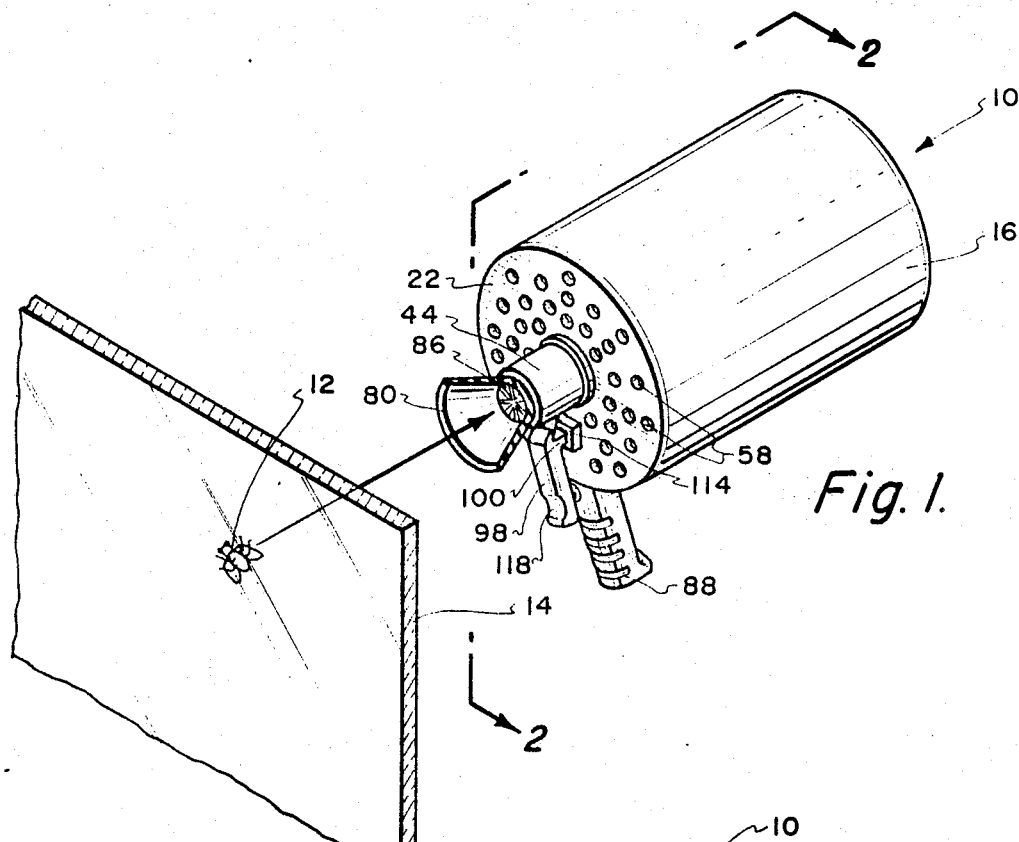
FIG. 1 is an isometric view of the first embodiment of the flying insect exterminating apparatus of this invention depicting positioning of the apparatus relative to the insect to be then actuated to capture the insect.

Referring primarily to FIGS. 1 and through 5 of the drawings, there is shown the first embodiment 10 of the flying insect exterminator of this invention. The first embodiment 10 is to be utilized to capture an insect 12 which is shown sitting on a window 14.

The flying insect exterminator 10 is constructed of a plastic, cylindrically shaped, housing 16 which defines an interior chamber 18. The housing 18 is substantially closed at its back end by a backplate 20 and also is closed at the front end by a front wall 22. Within the back wall 20 is formed a hole 24. This hole 24 is normally closed by a rubber valve member 26. The rubber valve member 26 is fixedly mounted on the backplate 20 by means of a securing stud 28. The securing stud 28 is mounted within an appropriate hole formed within the backplate 20. The function of the valve member 26 will be explained further on in this specification.

Movably mounted within the interior chamber 18 is a disc forming a piston 30. Centrally disposed within the piston 30 is an enlarged hole 32. Aligned with the hole 32 is an elongated opening 34 of a sleeve 36. The sleeve 36 is fixedly mounted onto the backside 38 of the piston 30. The sleeve 36 includes bayonet slot 40. The bayonet slot 40 is to connect with a pin 42 which is mounted on a tube 44. The tube 44 includes a series of holes 46 formed through the wall surface of the tube connecting with the interior compartment 48 of the tube 44. The openings 46 are located directly adjacent pin 42 which is quite close to the back wall 50 of the tube 44.

Fixedly mounted on the back wall 50 and protruding rearwardly thereof is hook 52. A similar hook 54 is mounted on the inside surface of the backplate 20 and is located in an aligned facing relationship with the hook 52. A rubber band 56 connects between the hooks 52 and 54. The length of the rubber band 56 has been carefully preselected for a reason which will become apparent further on in this specification.

The forward wall 22 of the housing 16 includes a mass of holes 58. The function of these holes 58 will be explained further on in this specification. Included with the wall surface of the interior chamber 18 is a longitudinal groove 60. Integrally formed with piston 30 is a notch 62. This notch 62 is located within the groove 60 and is closely formed thereto but is capable of free sliding movement within the notch 60. The reason for the notch 62 is to prevent pivoting or rotational movement of the piston 30 relative to the housing 16.

Figure 2:
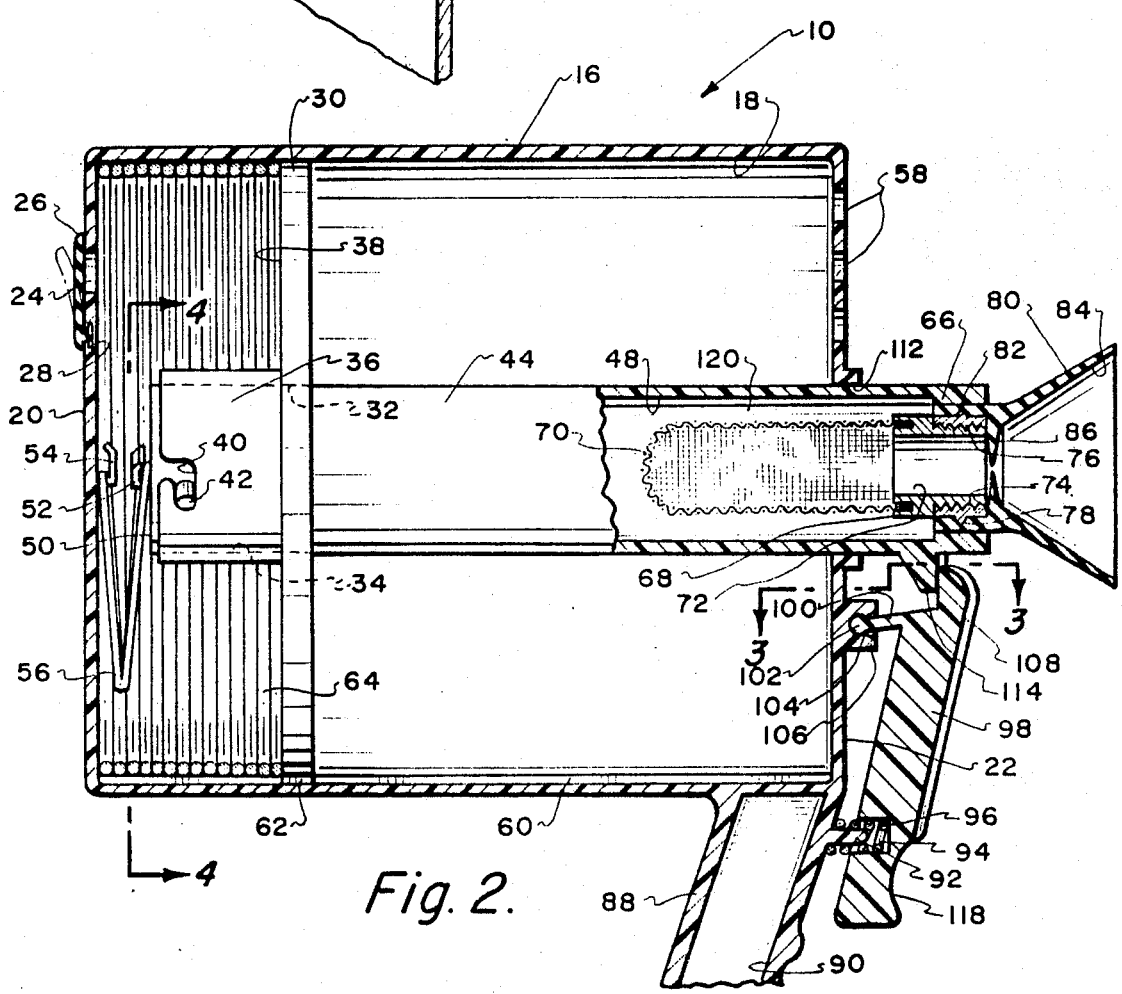
FIG. 2 is a cross-sectional view taken along line 2—2 of FIG. 1 showing the insect capturing tube in the retracted position.

Mounted within the interior chamber 18 in between the backplate 20 and the backside 38 of the piston 30 is a coil spring 64. The coil spring 64 applies a continuous bias against the piston 30 tending to move the piston 30 from the retracted position shown in FIG. 2 to the extended position shown in FIG. 3.

The outer free end of the tube 44 includes an inwardly extending annular flange 66. Within the annular flange 66 there is to be locatable in a snug fitting manner a collar section 67 of a cone-shaped cup 80. Both cup 80 and section 67 are formed of a resilient material such as rubber. This section 67 includes an interior annular recess 82. A snug fit exists between the section 67 and the flange 66. Within this recess 82 is located an annular ridge 78. This ridge 78 is formed on the exterior surface of an internally threaded female connector 76. Threadable connected with female connector 76 is an externally threaded male connector 74. This connector 74 includes an exterior forming collar 68. The collar 68 has attached thereto and extending rearwardly thereof a tubular screen 70. The collar 68 defines an access opening 72. The cup 80 defines an insect collecting chamber 84. This rubber cup 80 is to be deflectable upon coming into contact with a rigid surface such as a window 14. It is to be understood that section 67 is fixedly mounted onto the female connector 76.

Within the insect collecting chamber 84 there is integrally formed with the cup 80 a rosette formed of a plurality of deflectable fingers 86. The function of these fingers 86 will be explained further on in this specification.

Integrally connected to the exterior surface of the housing 16 is a graspable handle 88. In order to lighten weight of the handle 88 there is formed an interior chamber 90 within the handle 88. Integrally connected to the handle 88 and extending outwardly therefrom is a protuberance 92. Mounted on the protuberance 92 is a coil spring 94. Coil spring 94 sets within a recess 96 of a trigger 98. Integrally connected to the trigger 98 is a plate-like extension 100 which terminates at its outer end in a lineal protuberance 102. Protuberance 102 is mounted within a lineal groove 104 mounted within member 106 which is integrally formed with the front wall 22. The protuberance 102 is capable of a limited amount of pivoting movement within the groove 104. The trigger 98 terminates in a hook member 108.

Formed within the front wall 22 is a centrally disposed opening 112. The tube 44 is capable of being freely moved longitudinally within the opening 112. At the outer end of the tube 44 there is located a protuberance 114.

Referring particularly to FIG. 3 of the drawings, it can be seen that protuberance 114 includea a slanted surface. This slanted surface is to engage the similarly slanted surface of a groove 116 formed within hook member 108. The reason for this slanting of the surfaces will be explained further on in conjunction with the operation of this embodiment of the invention.

The operation of the flying insect exterminator 10 of this invention is as follows:

Let it be assumed that the exterminator 10 is in the position shown in FIG. 5 of the drawings. In order to cock the exterminator 10 of this invention, the user grasps with one hand the handle 88 and with the other hand moves tube 44 until pin 42 engages with bayonet slot 40. The user then pivots tube 44 until pin 42 locks into the bayonet slot 40 thereby locking together the tube 44 and the sleeve 36 along with the piston 30. It is to be noted that pivoting movement of the piston 30 is prevented by notch 62 resting within groove 60.

The operator then proceed to push against cup 80 moving the tube 44 and the piston 30 against the bias of the coil spring 64 compressing such. The user then manually presses the trigger 98 until the trigger 98 comes against the handle 88. In this particular position, the protuberance 114 is capable of passing over the hook member 108 and then when the trigger 98 is released, the coil spring 94 pivots the trigger 98 until the protuberance 114 comes to rest within the groove 116. it is to be noted that as the piston 30 moved to the retracted position, air within interior chamber 18 was evacuated into the ambient by passing through hole 24 deflecting valve member 26. With the piston 30 in this retracted postion, only a small amount of air remains within the portion of the chamber 18 that is located about coil spring 64.

The user then points exterminator 10 so that the cup 80 is about eight inches from the flying insect 12. The user then presses against recess 118 of trigger 98 pressing coil spring 94 and moving the trigger 98 toward handle 88. As the trigger 98 is so moved the protuberance 114 is also moved. However, the protuberance 114 rests against the inclined surface 116 of the hook member 108. This inclination is such that as the protuberance 114 slides in a direction to disengage from the groove 116 (shown in dotted lines in FIG. 3), there occurs a small amount of pivoting of the tube 44. This pivoting is sufficient to disengage the pin 42 from the bayonet slot 40. At this particular time, nothing is restraining the tube 44 or the piston 30 and both the piston 30 and the tube 44 fly forward very rapidly until the forward edge of the cup 80 surrounds the insect 12 with the insect 12 being located within the insect receiving chamber 84. It is to be noted that the forward edge of the cup 80 is now located against (and deflected against) the surface of the window 14 closing the insect receiving chamber 84 to the ambient.

With the cup 80 in contact with the window 14, the tube 44 should be in the fully extended position as shown in FIG. 5 of the drawings. Just prior to tube 44 reaching its fully extended position, the rubber band 56 has become taut. The force of this rubber band 56 pulls against the tube 44 permitting relative movement between the sleeve 36 and the tube 44 permitting the piston 30 to move against the front wall 22 of the housing 16. During this movement, the holes 46 connect with the interior chamber 18. The movement of the piston 30 to this extended position against the front wall 22 has resulted in a vacuum being drawn within the interior chamber 18 with the air downstream of piston 30 being discharged into the ambient through holes 58. The reason the vacuum occurs is that air is not capable of being conducted past valve member 26 since valve member 26 only permits air to be conducted into the ambient. This vacuum is then caused to be conducted through the holes 46 which are now exposed due to the rubber band 56 preventing further movement of the tube 44 along with the sleeve 36. This vacuum is conducted through the holes 46 into the compartment 48 surrounding the screen 70. This vacuum is also conducted past the deflectable fingers 86 into the insect receiving chamber 84. The result is the insect 12 is quickly drawn past the deflectable fingers 86 and into the enclosed area defined by the screen 70. At this particular time, the insect 12 is captured.

In most instances, the insect 70 will be propelled quite quickly into the area defined by the screen 70. Generally, this is a sufficient shock coupled with being conducted past the fingers 86 to exterminate the insect 12. It has been found to be preferable to have an annular space 120 be located about the screen 70. This means that the vacuum is located completely around the screen 70 and is not concentrated. This will prevent the insect 12 from being slammed into one area of the screen 70 and be dismembered. This even distribution of the vacuum about the screen 70 and therefore about the insect 12 will prevent this untidy dismembering of the insect 12.

At this particular time, the exterminator 10 is in the position again shown in FIG. 5 of the drawings and the user merely repeats the foregoing discussed operational procedures to recock the exterminator 10 and to refire it at another insect.

Upon a certain number of insects being collected within the screen 70, it is generally preferred to dispose of these insects. In order to achieve this, it is only necessary that the user grasp the cup 80 and withdraw such from the compartment 48. It is to be remembered that there is just a snug fit between the collar section 67 and the flange 66 which thereby permits quick and easy removal of the screen 70 from the compartment 48. The user then grasps the collar 68 and unthreads the cup 80 and the female connector 76 from the male connector 74 which separates the cup 80 from the screen 70. The insect contents within the screen 70 are then merely flushed by water at a faucet or just merely dumped into a trash container.

Figure 6:
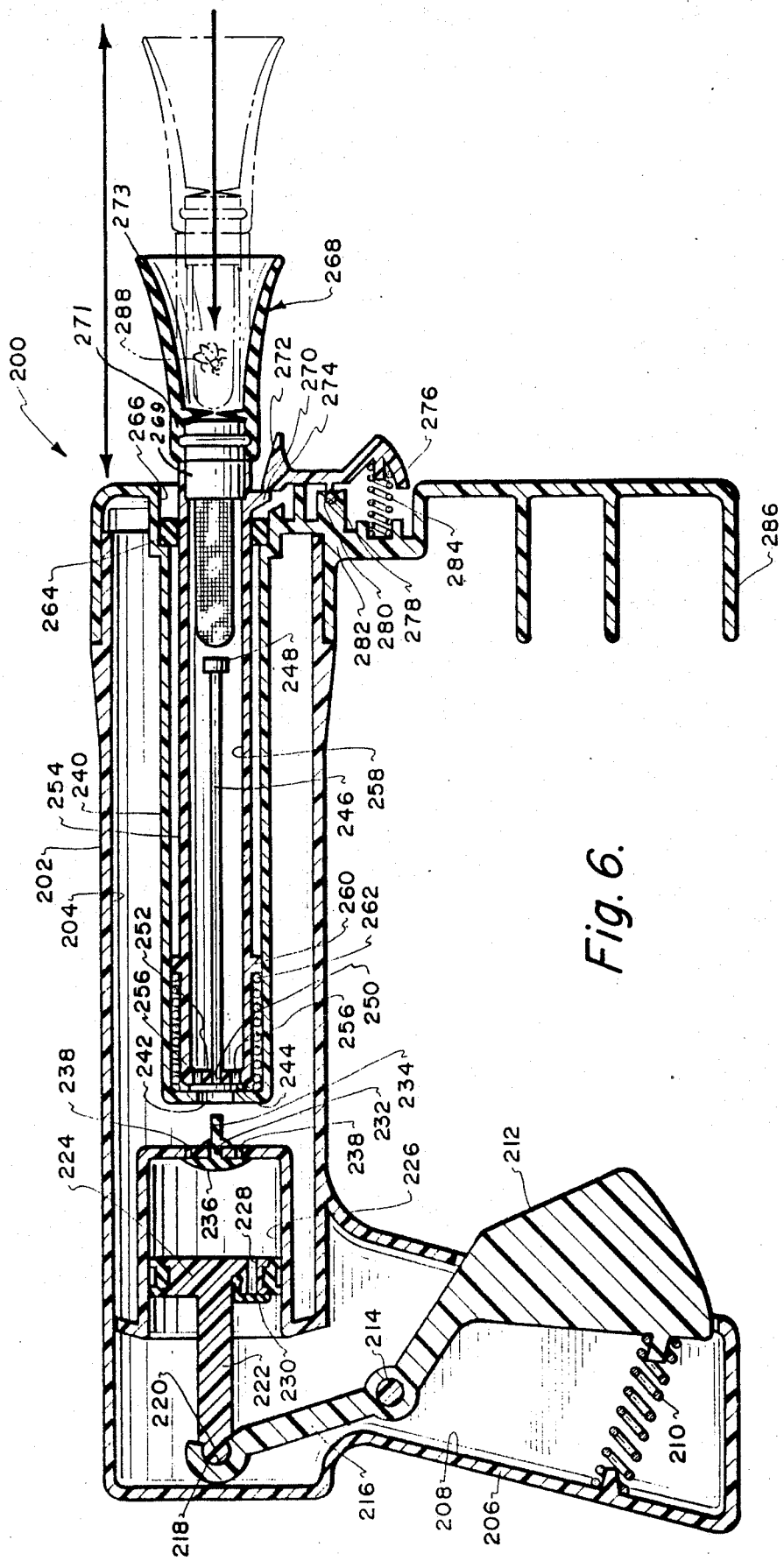
FIG. 6 is a cross-sectional view similar to FIG. 2 of a second embodiment of the flying insect exterminating apparatus of this invention.

Referring particularly to FIG. 6 of the drawings there is shown the second embodiment of the exterminator 200 of this invention. Exterminator 200 is composed of a housing 202 which has formed therein an interior chamber 204. The rear end of the housing 202 terminates in a handle 206. Within the handle 206 is located an interior chamber 208. Coil spring 210 is mounted within the chamber 208 and is adapted to exert a continuous bias against pump handle 212. The pump handle 212 is pivotally mounted on the handle 206 by means of a pivot pin 214. Integrally connected to the handle 212 and extending from the pivot pin 214 is an extension 216. The inner end of the extension 216 includes a ball recess 218. Within the ball recess 218 is located a ball 220. The ball 220 forms the outer end of a piston rod 222.

The inner end of the piston rod 222 connects to a piston 224. The piston 224 rides within cylinder 226. The piston 224 includes a hole 228. This hole 228 is closed on the exterior surface of the piston 224 by means of a valve member 230 which is in essence similar to valve member 26.

The inner end of the cylinder 226 includes an opening 232. Within the opening 232 is located a rubber rod 234. The inner end of the rubber rod 234 connects to a rubber disc 236. The rubber disc 236 normally covers holes 238 formed within the innermost wall of the cylinder 226.

The operator can then move the handle 212 relative to the handle 206 which will cause the piston 224 to move inwardly within the cylinder 226. During this inward movement, air contained within the cylinder 226 is caused to be passed into the ambient through hole 228 past valve member 230 into interior chamber 208 and hence into the ambient since interior chamber 208 connects directly with the ambient. During this inward movement of the piston 224, the valve member 236 is closed covering holes 238. When the user releases the handle 212, the coil spring 210 functions to move the handle 212 to the position shown in FIG. 6. During this time, the piston 224 moves from a position directly adjacent the valve member 236 to the position shown in FIG. 6. During this retracting movement, air from within the chamber 204 is caused to be moved through holes 238 past the valve member 236 which is now slightly displaced from the surface of the innermost wall of the cylinder 226. This air now becomes located within the cylinder 226. If the user then again pumps the handle 212 against the action of the coil spring 210, this air that is now contained within the cylinder 226 is caused to be conducted through the opening 228 past valve 230 into the interior chamber 208. Therefore, it can be seen that by continuous pumping of the handle 212 that a vacuum can be very quickly drawn within the interior chamber 204.

Located within the interior chamber 204 is a tube housing 240. The innermost wall surface of the tube housing 240 includes a hole 242. When the vacuum is being drawn within the interior chamber 204 this vacuum holds valve member 244 across opening 242 closing such. The valve member 244 is connected to a rod 246. The outer free end of the rod 246 is connected to an enlarged protuberance 248.

The rod 246 is loosely mounted within a hole 250 formed within the rear wall 252 of a tube 254. Within the rear wall 252 are a series of holes 256 whose purpose will be explained further on in this specification.

The rod 246 is located within interior compartment 258 of tube 254. Formed on the exterior wall surface of the tube 254 is an annular flange 260. A coil spring 262 abuts against the annular flange 260. The opposite end of the coil spring 266 abuts against the innermost wall of the tube housing 240.

The outer end of the tube 254 rides against sealing member 264. The sealing member 264 is snugly mounted within annular seat 266. It is to be understood that sliding movement is permitted between the tube 254 and the sealing member 264. Mounted within the outer open end of the tube 254 is a rubber deflecting cup and screen arrangement referred to generally as assembly 268. It is to be understood that this assembly 268 is in essence identical to cup 80 and screen 70 which has been previously described. The only difference is that the coller 269 (equivalent to collar 68) is snugly mounted in tube 254 rather than the collar section 271 of cup 273 being mounted against tube 254. For a more detailed description of this assembly 268, reference is to be had to the foregoing description in relation to reference characters 66 through 86.

Integrally mounted on the exterior surface of the tube 254 adjacent the assembly 268 is a protuberance 270. In moving of the tube 254 to the cocked position shown in FIG. 6, the protuberance 270 rides over cam surface 272 of a hook 274. Hook 274 is to connect with the outer wall surface of the protuberance 270 and prevent extending movement of the tube 254 relative to the tube housing 240. Hook member 274 is part of trigger 276. Trigger 276 is pivotally mounted by ball 278 which rides within socket 280. Socket 280 is formed within cap 282 which is fixedly mounted on the front end of the housing 202. The trigger 276 abuts against the coil spring 284 which presses against a portion of the cap 282. The lower end of the cap 282 is integrally mounted to a forward handle 286.

The operation of the embodiment 200 shown within FIG. 6 of the drawings is as follows:

The user presses against the cup of the assembly 288 moving the tube 254 to the rear retracted position shown in FIG. 6. The tube 254 is held in this retracted position by protuberance 270 riding over cam surface 272 coming to rest against the back surface of the hook 274. The user has previously operated the handle 212 to create a vacuum within an interior chamber 204.

When the cup of the assembly 268 is located about eight inches from the fly 288, the user presses down on trigger 276 compressing coil spring 284 which results in hook member 274 being pivoted to disengage from protuberance 270. The tube 254 will fly forward to an extended position and upon almost reaching the fully extended position, the wall 252 will contact enlarged protuberance 248 unseating valve member 244 from opening 242. As a result, the vacuum contained within interior chamber 204 is to be conducted through the opening 242, through holes 256 into the tube compartment 258 surrounding the screen of the assembly 268. As a result, the fly 288 is sucked in the same manner as previously described in relation to the first embodiment 10 of this invention to be located within the confines of the screen of the assembly 268.

It is to be understood that the assembly 268 is to be removable from the cap 282 in the same manner as what was discussed in relation to FIGS. 1 and 5 to dispose of the insects contained within the screen. The assembly 268 is then to be reinstalled in position.

What is claimed is:

1. A flying insect exterminator comprising:
    a housing, said housing have an enclosed interior chamber, said interior chamber being capable of containing a vacuum;
    pump means mounted within said internal chamber, said pump means for producing a vacuum within said internal chamber;
    a tube mounted on said housing, a portion of said tube being located within said internal chamber with another portion of said tube extending exteriorly of said housing, said tube being movable relative to said housing between a retracted position and an extended position, said tube having an outer free end, said outer free end forming an internal insect receiving chamber;
    an insect collecting screen mounted within said tube and located adjacent said insect receiving chamber;
    biasing means for thrusting of said tube from said retracted position to said extended position, said biasing means mounted within said internal chamber; and
    port means mounted within said internal chamber and connected to said tube, upon said tube reaching said extended position said port means being opened permitting communication of said vacuum to said insect receiving chamber causing a suction to occur moving any insect from within said insect receiving chamber into said insect collecting screen.

2. The flying insect exterminator as defined in claim 1 wherein:
    said insect collecting screen being tubular forming a cylindrical side wall, said cylindrical side wall being spaced from the internal wall of said tube.

3. The flying insect exterminator as defined in claim 1 wherein:
    said biasing means comprising a coil spring.

4. The flying insect exterminator as defined in claim 1 wherein:
    delayed actuation means located within said interior chamber and connected to said tube, said delayed actuation means being activated just prior to said tube reaching said extended position thereby opening said port means and permitting said vacuum to affect said insect receiving chamber.

5. The flying insect exterminator as defined in claim 4 wherein:
    said delayed actuation means comprising a resilient band, a piston mounted within said interior chamber, said piston being capable of being moved from a withdrawn position to a fully extended position, said tube being mounted within said piston, said tube moving simultaneously with said piston during movement of said piston from said withdrawn position to said fully extended position with the exception when said piston approaches said fully extended position said resilient band limits further movement of said tube permitting said piston to move relative to said tube, said port means being mounted within said tube, said port means becoming exposed to said interior chamber upon said piston reaching said fully extended position, movement of said piston to said fully extended position results in the creation of said vacuum within said interior chamber.

6. The flying insect exterminator as defined in claim 4 wherein:
    said delayed actuation means comprising a valve member, a rod being attached to said valve member, said rod having an outer free end, said outer free end of said rod being attached to an enlarged protuberance, upon said tube approaching said extended position said tube contacting said enlarged protuberance and unseating said valve member thereby causing said vacuum to affect said insect receiving chamber.

7. The flying insect exterminator as defined in claim 1 wherein:
said pump means being separate from the movement of said tube from said retracted position to said extended position.

8. The flying insect exterminator as defined in claim 1 wherein:
said pump means being connected to said tube with said vacuum being produced simultaneously with the movement of said tube from said retractd position to said extended position.

* * * * *